United States Patent
Lang et al.

(10) Patent No.: US 9,333,918 B2
(45) Date of Patent: May 10, 2016

(54) LENGTH-ADJUSTABLE EXTERIOR MIRROR ARRANGEMENT

(75) Inventors: Werner Lang, Ergersheim (DE); Elmar Finkenberger, Adelshofen (DE)

(73) Assignee: MEKRA Lang GmbH & Co. KG (DE)

( * ) Notice: Subject to any disclaimer, the term of this patent is extended or adjusted under 35 U.S.C. 154(b) by 241 days.

(21) Appl. No.: 14/112,651

(22) PCT Filed: Oct. 19, 2011

(86) PCT No.: PCT/EP2011/068280
§ 371 (c)(1),
(2), (4) Date: Dec. 31, 2013

(87) PCT Pub. No.: WO2012/146322
PCT Pub. Date: Nov. 1, 2012

(65) Prior Publication Data
US 2014/0111879 A1    Apr. 24, 2014

(30) Foreign Application Priority Data

Apr. 27, 2011   (DE) .......................... 10 2011 002 295

(51) Int. Cl.
| | | |
|---|---|---|
| *G02B 7/182* | (2006.01) | |
| *B60R 1/072* | (2006.01) | |
| *B60R 1/06* | (2006.01) | |
| *B60R 1/078* | (2006.01) | |

(52) U.S. Cl.
CPC . *B60R 1/072* (2013.01); *B60R 1/06* (2013.01); *B60R 1/0612* (2013.01); *B60R 1/078* (2013.01)

(58) Field of Classification Search
CPC ........ B60R 1/074; B60R 1/072; B60R 1/078; B60R 1/066; B60R 1/06

USPC ......................................... 359/871, 872, 877
See application file for complete search history.

(56) References Cited

U.S. PATENT DOCUMENTS

| | | | |
|---|---|---|---|
| 2,342,540 | A | 2/1944 | Hale |
| 2,511,518 | A | 6/1950 | Stephens |
| 4,468,206 | A | 8/1984 | Herchenbach |
| 5,313,336 | A | 5/1994 | Sakao |
| 5,563,741 | A | 10/1996 | Leonberger |
| 6,213,609 | B1 | 4/2001 | Foote |

(Continued)

FOREIGN PATENT DOCUMENTS

| | | |
|---|---|---|
| CN | 1207993 | 2/1999 |
| CN | 2611224 | 4/2004 |

(Continued)

OTHER PUBLICATIONS

German Office Action issued in German Application No. 10 2011 002 295.3, mailed Nov. 7, 2011, with partial English translation.

(Continued)

*Primary Examiner* — Euncha Cherry
(74) *Attorney, Agent, or Firm* — RatnerPrestia (57) ABSTRACT

An exterior mirror arrangement for motor vehicles, in particular utility vehicles, has a holder mounted on a vehicle, a housing which is fastened, preferably latchably articulatedly connected, to the holder, and a holding member, which is displaceably received in the housing, for a vehicle exterior mirror. The housing has a housing portion which is formed in one piece from plastic and which alone guides the holding member.

15 Claims, 9 Drawing Sheets

(56) References Cited

U.S. PATENT DOCUMENTS

| | | | |
|---|---|---|---|
| 6,325,518 B1 | 12/2001 | Whitehead | |
| 6,361,178 B1 | 3/2002 | Lang | |
| 7,121,673 B2 * | 10/2006 | Sakata | B60R 1/074 359/877 |
| 8,628,200 B2 | 1/2014 | vanStiphout | |
| 2002/0021506 A1 | 2/2002 | Whitehead | |
| 2003/0117729 A1 | 6/2003 | Foote | |
| 2003/0202263 A1 | 10/2003 | Georges | |

FOREIGN PATENT DOCUMENTS

| | | |
|---|---|---|
| DE | 3141534 | 5/1983 |
| DE | 89 06 260 U1 | 11/1990 |
| DE | 39 38 961 A1 | 5/1991 |
| DE | 603 04 385 T2 | 2/2007 |
| DE | 102009003672 | 9/2010 |
| EP | 0 399 401 A1 | 11/1990 |
| EP | 573130 | 12/1993 |
| GB | 868 642 A | 5/1961 |
| GB | 2131503 | 6/1984 |
| JP | 58142029 | 8/1983 |
| JP | 0253652 | 2/1990 |
| JP | 2149334 | 12/1990 |
| JP | 0586689 | 11/1993 |
| JP | 2002541025 | 12/2002 |
| JP | 2009208629 | 9/2009 |
| JP | 2009536899 | 10/2009 |
| RU | 2031266 | 3/1995 |

OTHER PUBLICATIONS

International Search Report issued in corresponding International Application No. PCT/EP2011/068280, mailed Jan. 16, 2012.
Russian Decision on Grant mailed Jul. 30, 2015 for Russian Application No. 2013151813/11(080743).
Japanese Office Action issued Sep. 15, 2015 for Japanese Application No. 2014-506778, including English translation.
Japanese Office Action issued in Japanese Application No. 2014-506778 mailed Mar. 10, 2015, with English translation.
German Office Action issued in German Application No. 10 2011 050 440.0 mailed Dec. 21, 2011, with partial English translation.
International Search Report issued in International Application No. PCT/EP2011/068279, mailed Jan. 31, 2012.
Russian Office Action mailed Mar. 23, 2015 in Russian Application No. 2013151813/11(080743), including partial translation.
Entire patent prosecution history of U.S. Appl. No. 14/112,592, filed Dec. 31, 2013, entitled, "Automatically Switching Clutch for a Motor Vehicle Exterior Mirror Adjustment Means."
Chinese Office Action mailed May 5, 2015 in Chinese Application No. 201180070437.7, with English translation.
Chinese Office Action mailed May 6, 2015 in Chinese Application No. 201180070436.2.
Chinese Second Examination Report, Filing No. 201180070437.7, mailed Nov. 16, 2015.
Japanese Notice of Reason(s) for Refusal for Japanese Application No. 2014-506777, mailed Nov. 10, 2015, with English translation.
Non Final Office Action mailed Dec. 21, 2015 for U.S. Appl. No. 14/112,592.

* cited by examiner

Fig. 13

LENGTH-ADJUSTABLE EXTERIOR MIRROR ARRANGEMENT

RELATED APPLICATIONS

This is the U.S. National Phase of International Application No. PCT/EP2011/068280, filed Oct. 19, 2011, which claims the benefit of priority of German Application No. 10 2011 002 295.3, filed Apr. 27, 2011, the contents of which is incorporated by reference herein in its entirety and for all purposes.

FIELD

The present invention relates to an exterior mirror arrangement for motor vehicles, in particular utility vehicles.

BACKGROUND

In some cases it may be necessary not only to adjust the angle or the alignment of a vehicle exterior mirror, but also to adjust its distance from the vehicle body. Such a length adjustment can, for example, be necessary in a vehicle with an extra-wide trailer to offer the driver an adequate view to the rear. If no extra-wide trailer is to be pulled, the vehicle exterior mirror which is protruding far outwards can be brought nearer to the body via the length adjustment, which not only has aerodynamic advantages, but also the risk of damaging the exterior mirror when parking or driving through narrow passages decreases.

From the publication DE 39 38 961 A1, a telescoping adjustment for an exterior mirror is known. In this case, the exterior mirror is attached to a continuously adjustable telescopic tube, which in turn is articulated by means of two flat profiles of a holding frame on the vehicle cabin. This open design of the mirror means is not only problematic from an aerodynamic point of view, but also has the disadvantage that the joint and also the telescopic tube are exposed to the elements. Since round telescopic tubes are not only displaceable, but also rotatable with respect to each other, the length adjustment in such an arrangement must also be able to receive torques which are applied by external forces onto the mirror.

Therefore progress has been made here using rectangular tubes which are mutually displaceable but not rotatable. The fixing of a defined relative position of the square tubes relative to each other has been achieved for example via a two-sided clamping. The previously mentioned problems of the aerodynamic behaviour and protection from the elements were addressed by assembling a housing around the telescopic means, said housing being formed from two pressure cast halves which are screwed together.

In practice however, it has been shown that this solution is not only heavy, but also does not satisfy in all cases the strength requirements for the force application from the exterior mirror to the holder mounted on the vehicle or the vehicle frame.

SUMMARY

An object of the present invention is to provide an exterior mirror arrangement for motor vehicles that permits a length adjustment of the vehicle exterior mirror or of the holding member to which the vehicle exterior mirror is assembled, wherein said exterior mirror arrangement is simply designed and/or manufacturable, achieves a weight reduction of the arrangement as a whole and satisfies the strength requirements.

A holding member for a vehicle exterior mirror according to the invention is displaceably accommodated in a housing which is in turn fixed to a holder mounted on a vehicle. Here the housing comprises a housing portion formed as one piece from plastic, which guides alone the holding member.

Because the housing portion guiding the holding member is made from plastic, a significant weight reduction of the mirror means as a whole arises from this. Furthermore, it has been found that a plastic housing formed as one piece is significantly stiffer than the above mentioned pressure-cast housing halves which are screwed to each other. Furthermore, in the case of a plastic housing, large degrees of freedom arise in view of its design, such that the housing according to the invention is not only economically produced, but also permits a flexible design according to application case.

Since the housing according to the invention involves an integrally load-carrying hollow body from plastic, a manual or motor-driven adjustment mechanism or a adjustment mechanism by another means can also be accommodated, in addition to the displaceably accommodated holding member.

The housing may be attached via a snap hinge to a holder mounted on the vehicle. In this way the housing together with holding member, and vehicle exterior mirror that is fixed to it, folds up, e.g. in narrow passages or under application of external force, in order to avoid damaging the mirror.

The housing portion that carries and guides the holding member may preferably comprise a plain bearing portion in which the holding member is linearly guided directly on the housing portion or on glide strips incorporated in it. By this arrangement, the plastic housing undertakes so to speak the function of the outer telescopic tube known from the prior art whereby the number of individual parts of the exterior mirror arrangement and thus the complexity of the mirror means can be reduced. In order to increase the sliding effect of the holding member which is accommodated displaceably in the housing, corresponding glide strips from a material with low friction coefficient can be interposed.

As a material for the glide strips, a thermoplastic polymer such as Polyoxymethylene (POM) may preferably be used on account of its high abrasion resistance and low friction coefficient.

In order to hold or fix the holding member or the exterior mirror in a defined position, a clamping device may be provided at the plain bearing portion, which clamping device prevents, via a force-fit or frictional fit, a relative movement from holding member and housing.

Alternatively, in place of a clamping device, a fixing device may be provided which achieves a form-locking fit between the housing and the holding member, e.g. via latching elements provided in sections.

A clamping lever arranged pivotably at the plastic housing portion may serve as clamping device, which clamping lever comprises a cam with which a clamp piece provided on the plain bearing portion, preferably via a leaf spring arrangement, may be biased against an outer wall of the holding member.

By the integration of the clamping device, i.e. the clamping lever, the clamp piece and optionally the leaf spring arrangement, the holding member in the housing portion may be fixed and adjusted without further tools. Thus the plain bearing portion serves not only the purpose of the linear guiding of the holding member but at the same time also serves as a type of retaining section for fixing the holding member in a defined position. Here the clamping lever pushes on a clamp piece such that a frictional fit exists not only between the clamp piece and the external wall of the holding member, but also between the external wall of the holding member and the opposite-lying housing portion or guide strip section.

By interconnection of a leaf spring, this serves, during the operating of the clamping lever, not only for tolerance matching, but it also defines a uniform biasing load such that not only a simple handling under clamping and releasing of the clamping lever is achieved, but also a defined clamping force. This has an advantage over previously used pointwise arranged clamping screws, whose clamping effect depended on the particular torque and the holding member was sometimes not fixedly and securely fastened.

Preferably the clamping lever is arranged at the housing portion such that it is completely accommodated in a recess of the housing when in the clamped state. In this way the clamping lever is not only protected from applications of external force, but also can be aerodynamically completely stored in the housing.

In addition to the plain bearing portion, the first housing portion may furthermore comprise a guide section having one or a plurality of guide ribs which engage in corresponding grooves of a slider, which slider is provided at the holding member. Here the grooves and the guide ribs extend in the adjustment direction of the holding member. By the interaction of the guide ribs which are configured inside the hollow plastic housing, and the grooves of the slider, the linear guiding of the holding member displaceably accommodated in the housing is further improved. In addition to the linear guiding, the guide ribs which engage in the grooves of the slider which is fixedly connected to the holding member ensure that the holding member or the vehicle exterior mirror cannot be twisted toward the housing. By the interaction of slider and guide ribs, a defined geometry for the input of bending and torsional moments is achieved. By the interaction of the slider and the guide ribs, the holding member is guided and centred inside the housing.

Moreover, the slider serves as a type of adapter such that for the application in the mirror means according to the invention, an ordinary and commonly used U-formed tubular holding member can be used and optionally can be modified or retrofitted with a slider according to the invention.

The housing may furthermore comprise a second housing portion via which the holder mounted on the vehicle may be connected to the first housing portion. Thus the first housing portion may be designed corresponding to its main function, namely the sole accommodating and guiding of the holding member and of the adjustment mechanism, and the fixing to the holder mounted on the vehicle may take place via a second housing portion specially provided for this and preferably also integrally formed from plastic. In this way, for example, it may be achieved that a structurally identical first housing portion may be fixed to different holders mounted on the vehicle, while only one correspondingly differently configured second housing portion is used.

The first or second housing portion, preferably both housing portions, has a fixing portion mounted on the vehicle for fastening to the holder. This fixing portion mounted on the vehicle may comprise a metal plate which serves as local strengthening for the fastening of the housing portion to the holder, without significantly increasing here the weight of the housing in total. In order to improve the manual operability, the metal plate may be integrated in the form of a metal insert molded into the housing portion in the vehicle-side fixing portion of the housing. The properties of the housing may be changed by the dimensioning of the metal plate or metal insert, and adapted to suit the respective custom requirements. Thus according to the invention, the force from the housing can be introduced by secure means onto the holder mounted on the vehicle.

As mentioned above, the housing may be latchably hinged at the holder mounted on the vehicle. The holder may advantageously comprise here a Molded latching tooth geometry which stays in operative connection with a latching element which is arranged between the fixing portion of the first or second housing portion and the holder. When a latching tooth geometry is configured at the holder, the latching joint comprises not only fewer components, but also may be encapsulated from environmental influences so that the latching joint is less susceptible to corrosion and wear.

The interposed latching element is preferably connected via a groove-spring connection to the fixing portion of the first or second housing portion with a form-locking fit connection and thus is rotationally fixed to it.

In order to permit a defined pivoting motion of the housing at the holder mounted on the vehicle, the fixing portion of the first or second housing portion comprises a plain bearing bush configured on it, which plain bearing bush is pivotably accommodated in a corresponding receptacle of the holder. Since the housing portion is configured from plastic, this plain bearing bush may also be correspondingly simple to manufacture. Furthermore, the number of components can also be reduced in this way.

According to the invention, the holding member which is accommodated in the housing may be manually operated and adjusted by pulling or pushing and thus the distance of the exterior mirror with respect to the vehicle body can be changed. Alternatively however, the exterior mirror arrangement may comprise an electric actuating unit for adjusting the holding member which for example is controllable from inside the cabin, which is more comfortable for the operator. The adjustment of the holding member via the electrical actuating unit may take place in various ways. For example, the actuating unit may drive a spindle which remains engaged with a trapezoidal thread Molded in the slider. When the holding member is configured as a tube, the spindle can accommodate the inside of the holding member, whereby a particularly compact method of construction may be achieved. Alternatively the holding member may be adjusted easily via cables coupled with the slider or via a toothed rack drive.

The electric actuating unit may preferably be arranged in the first housing portion configured as a hollow body, and a vehicle-side external periphery section of the electric actuating unit may be configured complementarily to a circumferential inner wall of the first housing portion. Thus the electric actuating unit may close and seal the first housing portion mounted on the vehicle such that the entire adjustment mechanism and the electric actuating unit are sealed within the housing portion. Preferably a transmission cover of the electric actuating unit or of the electric motor can undertake this closing or sealing function. In this way not only a simple construction but also an integration of two functions in one component is ensured.

According to another or a further aspect of the invention, the electric actuating unit may adjust the holding member even when the holding member is firmly clamped to the plain bearing portion via the clamping device. By means of the permanent tension, vibrations between holding member and housing may be minimised. For example, the clamping lever remains always closed.

According to another or a further aspect of the invention, a clutch device is connected between the electric actuating unit and the spindle, which electric actuating unit permits a transmission of a torque necessary for the adjustment of the holding member from the electric actuating unit to the spindle in both directions and, in the event of an overload torque greater than a predetermined threshold torque, automatically permits a relative rotation between the electric actuating unit and the spindle. The clutch is further configured such that no adjustment torque is transmitted in the event of a torque direction reversal over a predetermined free-travel angle. In this way, on the one hand an overload protection is ensured and on the other hand, in the case of a change in rotational direction, a load-free start-up of the electric actuating unit to a determined rated speed is permitted. Both have a positive effect on the operation and the life of the electric actuating unit.

The clutch device can comprise a clutch bell driven by the electric actuating unit and a carrier rotationally fixedly connected to the spindle. Here the carrier may comprise loaded rolling elements or sliding elements evenly distributed over its periphery which are radial outwardly spring-loaded and pressed against an inner wall of the clutch bell, and the inner wall of the clutch bell may comprise evenly distributed raised portions over its periphery that push the rolling elements or sliding elements radial inwardly in the event of an overload torque greater than the predetermined threshold torque.

Through the load-free starting up, a part of the kinetic energy of the clutch bell and of the inertia torque of the electric actuating unit is imparted in the form of an impact to the rolling elements and thereby also to the carrier, before the form-locking fit connection between the rolling elements and the protrusions, i.e. between the clutch bell and the carrier, engages and the torque to be transmitted is transmitted. This effect which is undesired in normal transmission technology is, in the case of the exterior mirror arrangement according to the invention, intended in order to release a temporary jamming of the holding member and the housing, e.g. because of dirt contamination.

The number of raised portions may be higher than the number of rolling elements or sliding elements. In this way the latching angle and with it the play between clutch bell and carrier or between electric actuating unit and spindle may be kept low.

BRIEF DESCRIPTION OF THE DRAWINGS

The foregoing summary and the description that follows will be better understood in conjunction with reference to the attached drawings. In the figures.

DETAILED DESCRIPTION OF PREFERRED EMBODIMENTS

Figure 1:
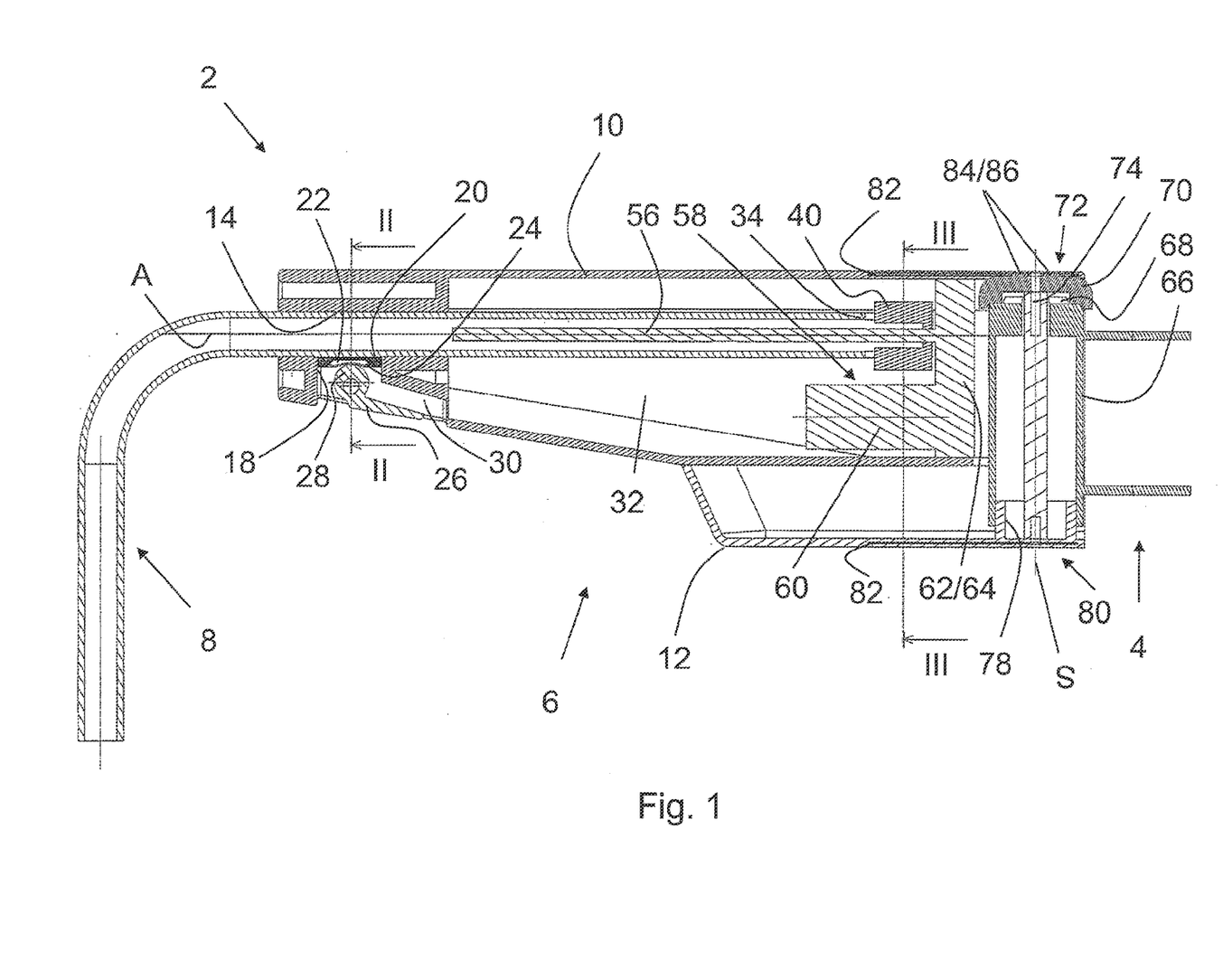
FIG. 1 shows a cross-sectional view of an exterior mirror arrangement according to a first embodiment of the invention.

FIG. 1 shows a cross-sectional view of an exterior mirror arrangement 2 according to a first embodiment of the invention having a holder 4 mounted on the vehicle, a housing 6 and a holding member 8. The holding member 8 serves the purpose of fastening of a vehicle exterior mirror (not shown).

The housing 6 consists of a first housing portion 10 and a second housing portion 12, wherein the first housing portion 10 alone supports and guides the holding member 8 and the second housing portion 12 serves essentially only to attach the housing 2 to the holder 4.

The first housing portion 10 comprises a sliding portion 14 on its side facing away from the holder 4, in which the holding member 8 is displaceably accommodated. The sliding portion 14 is essentially formed by a cylindrical recess in the first housing portion 10, which recess is provided with glide strips 16 (not shown) made of POM.

The sliding portion 14 comprises a radial opening 18, in which a clamping piece 20 is radially displaceably accommodated. The clamping piece 20 is configured complementarily to the holding member 8, i.e. cylindrically concavely configured, and lies planarly at an external wall of the holding member 8 (see FIG. 2). The clamping piece 20 has a recess 22 on its side facing away from the holding member 8, wherein the recess 22 is loaded by a leaf spring 24.

In the sliding portion 14, a manually operable clamping lever 26 is further rotatably arranged, wherein the pivot axis K is a transverse axis which is radially spaced with respect to the centre-axis A of the holding member 8, which transverse axis is located radially externally to the clamping piece 20. The clamping lever 26 comprises a cam 28 which, upon pivoting of the clamping lever 26 about the pivot axis K, pushes on the leaf spring 24 and elastically deforms it in the direction of the holding member 8. The clamping piece 22 is radial inwardly pressed via the spring force of the leaf spring 24 and forms a force-fit or frictional fit connection with a portion of the external wall of the holding member 8 and pushes further the holding member 8 by means of frictional fit at the opposite lying side of the cylindrical recess of the sliding portion 14.

Figure 2:
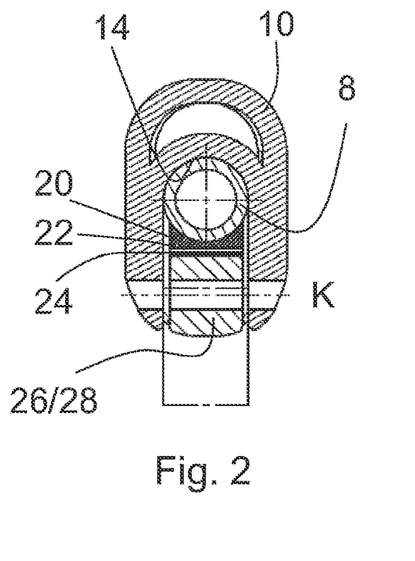
FIG. 2 shows a cross-sectional view along the line II-II of FIG. 1.

FIG. 2 shows a cross-sectional view along the line II-II in FIG. 1, which line runs parallel to the pivot axis K and vertically to the centre-axis A.

The sliding portion 14 further comprises a recess 30 in which the clamping lever 26 in its clamped state (as shown in FIG. 1) is completely accommodated in the sliding portion 14 or the first housing portion 10, and is hidden inside it. The recess 30 is furthermore so sized that one can grip the clamping lever 26 by hand or with a tool in order to operate it.

The first housing portion 10 furthermore comprises a thin-walled hollow body section 32 which borders onto the sliding portion 14 on the holder side, and surrounds an end section 34 of the holding member 8. As can be seen from FIG. 3 which shows a section view along Line III-III of FIG. 1, the hollow body 32 comprises two inwardly protruding and mutually opposing guide ribs 36 which extend parallel to the centre-axis A and which slidingly engage in corresponding longitudinal grooves 38 of a slider 40 which is fixed at the end section 34 of the holding member 8. So that the slider 40 is rotationally fixed at the holding member 8, the interaction of the guide ribs 36 and grooves 38 ensure that the holding member 8 is displaceable along the centre-axis A but is not rotatable about said centre-axis. Any applications of external force to the vehicle exterior mirror or the holding member 8 is received by the guide ribs 36. The axial extent of the guide ribs 36 corresponds here at least to the maximum displacement of the holding member 8 in the housing 6.

Figure 3:
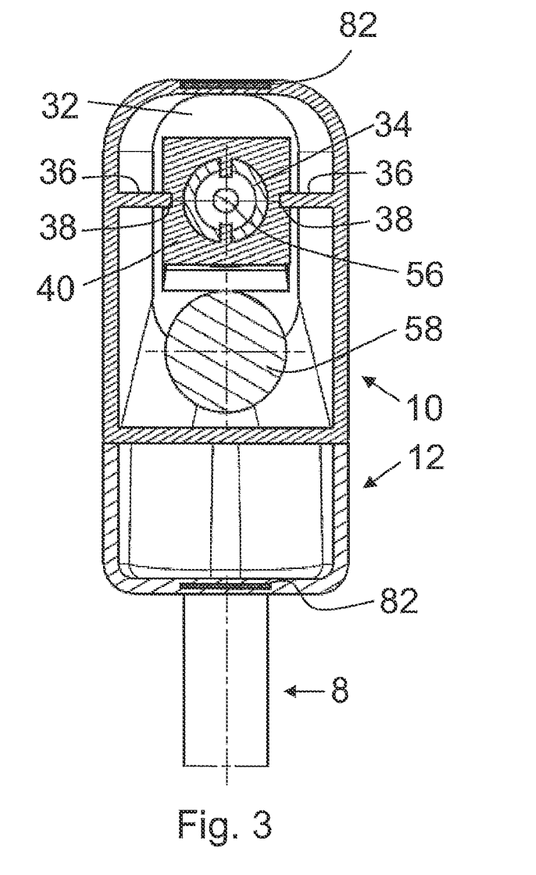
FIG. 3 shows a cross-sectional view along the line in FIG. 1.

The hollow body section 32 in connection with the guide ribs 36 forms a guide section in the meaning of the invention. Thus the holding member 8 is guided on the one hand at the sliding portion 14 as well as at the guide ribs 36. Furthermore, the sliding portion 14 and the guide ribs 36 take the bending moments. Due to the long lever arm between sliding portion 14 and the position at which the slider 40 is guided into the guide ribs 36, the bending forces may be kept low.

Figure 4:
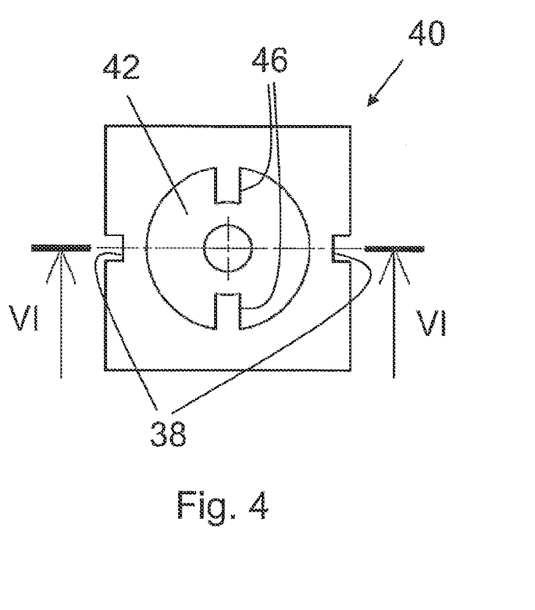
FIG. 4 shows a front view of a slider of the exterior mirror arrangement according to the first embodiment of the invention.
Figure 5:
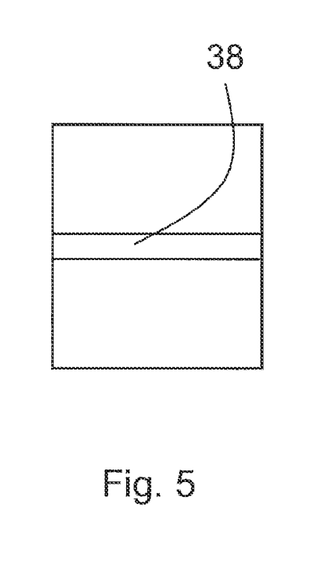
FIG. 5 shows a side view of the slider.
Figure 6:
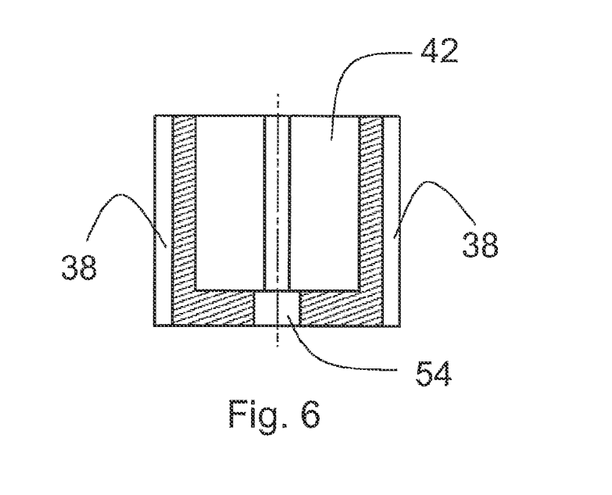
FIG. 6 shows a cross-sectional view of the slider.
Figure 7:
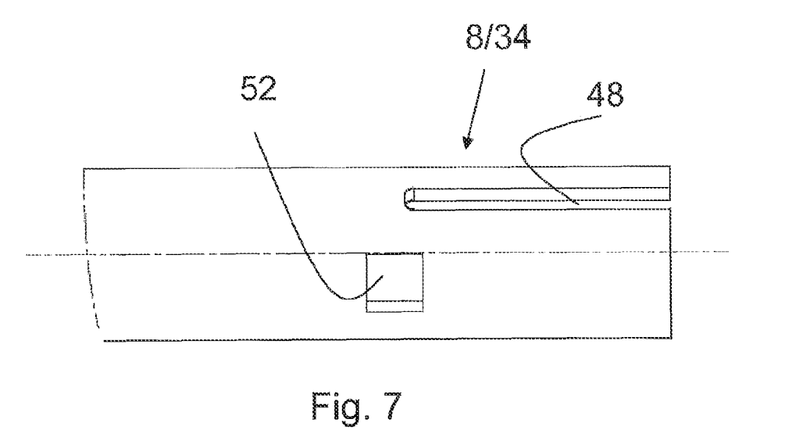
FIG. 7 shows an end section of a holding member of the exterior mirror arrangement according to the first embodiment of the invention.
Figure 8:
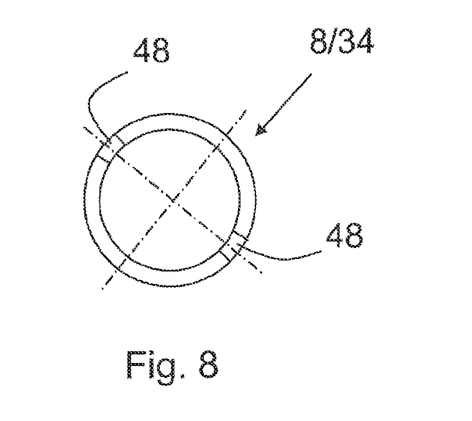
FIG. 8 shows a side view of the end section of the holding member.

FIGS. 4, 5 and 6 show various views of the slider 40. FIG. 4 is a front view, FIG. 5 is a side view and FIG. 6 is a cross-sectional view along line VI-VI in FIG. 4. The slider 40 is essentially a cube-shaped body which comprises the longitudinal grooves 38 on two opposite sides and on a third side comprises a cylindrical recess 42 having two inwardly protruding, mutually opposing and axially extending, protrusions 46. When the slider 40 is introduced to the end section 34 of the holding member 8, the protrusions 46 engage in longitudinal slots 48 which are provided at the end section 34 of the holding member 8 (see FIGS. 7 and 8). The slider 40 configured in this way has a high stiffness and may transmit bending and torsion moments which are introduced via the holding member 8 to the first housing portion 10. Furthermore the slider 40 is an integrated component with customized properties, that in addition is also economically manufacturable.

The outer diameter of the end section 34 and the inner diameter of the recess 42 are toleranced as a press-fit. Furthermore the slider 40 (not shown) comprises snap hooks 50 which engage elastically and with form-locking fit in a corresponding return spring or in a corresponding recess 52 (see FIG. 8). In this way the slider 40 is fixedly rotationally located on the holding member 8 and is axially fixed to it.

A central threaded hole 54 having a trapezoidal thread is configured at the bottom of the recess 42, which hole is in operative connection with a spindle 56 which is driven via an electric actuating unit 58 consisting of an electric motor 60 and a transmission 62. The electric actuating unit 58 as well as the spindle are only schematically shown in FIG. 1. It is noted however that a section of the electric actuating unit 58, which is on the side of the holder, e.g. a transmission cover 64 is complementarily configured to the inner periphery of the first housing portion 10 and therefore the adjustment mechanism which is located completely in the first housing portion 10 may be closed off, preferably sealed, from the outside.

When the spindle 56 is driven in the one or the other direction, the slider 40 located in engagement with the spindle 56 is moved along the axis of the spindle 56, which axis coincides with the centre-axis A of the end section 34 of the holding member 8 and represents at the same time the displacement axis of the holding member 8, and the holding member 8 which is fixedly connected to the slider 40 is axially displaced. Here the guide ribs 36 of the first housing portion 10 slide in the longitudinal grooves 38 of the slider 40 and the outer wall of the holding member 8 slides on the glide strips 16 in the sliding portion 14. In order to minimise vibrations between holding member 8 and housing 6, the clamping lever 26 remains closed here. The clamping piece 20 therefore permanently presses on the holding member and maintains the spring-load. The electric motor 60 must therefore overcome basically the frictional force between the plain bearing portion 14 and holding member 8 when operating the holding member 8. The frictional force to be overcome is however reduced by means of the glide strips 16. When the vehicle exterior mirror and/or the holding member 8 is located in the desired position, the electric actuating unit 58 can be stopped and the position is mechanically fixed via the clamping lever 26 and the clamping piece 20. In this way the electric actuating unit 58 can be released and turned off.

When no glide strips 16 are provided, alternatively the clamping lever 16 can be released before the operation of the holding member 8 and can be clamped after the operation.

As can further be seen in FIG. 1, the first housing portion 10 serves for the partial accommodation of the holder 4 mounted on the vehicle. In this way the holder 4 comprises a hollow cylindrical portion 66 running vertically to the centre-axis A, to which the housing 6 is pivotably fixed about a pivot axis S. The cylindrical portion 66 of the holder 4 comprises at one end an integrally formed latching tooth geometry 68 and can be fixed under interconnection of a latching element 70 to a fixing portion 72 of the first housing portion 10 via a screw connection 74.

On the opposite side, the holder 4 is connected to the housing 6 via the second housing portion 12. In addition the cylindrical portion 66 of the holder 4 comprises a recess 76 which is configured to accommodate a cylindrical plain bearing bush 78 which is configured inside a fixing portion 80, when the second housing portion 12 is connected to the first housing portion 10.

As can be understood further from FIGS. 1 and 3, metal inserts 82 in the plastic housing are molded into the thin-walled fixing portions 72, 80 of the first and/or second housing portion 10, 12, which metal inserts serve to strengthen the fixing portions 72, 80 and to apply force from the housing 6 to the holder 4.

As can be understood further from FIG. 1, the fixing portion 72 of the first housing portion 10 comprises grooves 84 in which externally integrally formed protrusions 86 at the latching element 70 engage with a form-locking fit. The holder 4 is screwed via the latching element 70 into the metal inserts 82 molded into the first housing portion 10. In this way the latching element 70 is rotationally fixed to the first housing portion 10. This form-locking fit may also be alternatively achieved through a groove-spring connection.

The cylindrical joint portion 66 of the holder 4 is biased by means of a spring (not shown) against the latching element 70, and the cylindrical joint portion 66 is bordered between the first and the second housing portion 10, 12 such that the latching element 70, under a correspondingly applied pivot torque of predetermined size, twists against the spring preload with respect to the latching tooth geometry 68 of the holder 4 and in this way permits a pivoting motion between the housing 6 and the holder 4.

Figure 9:
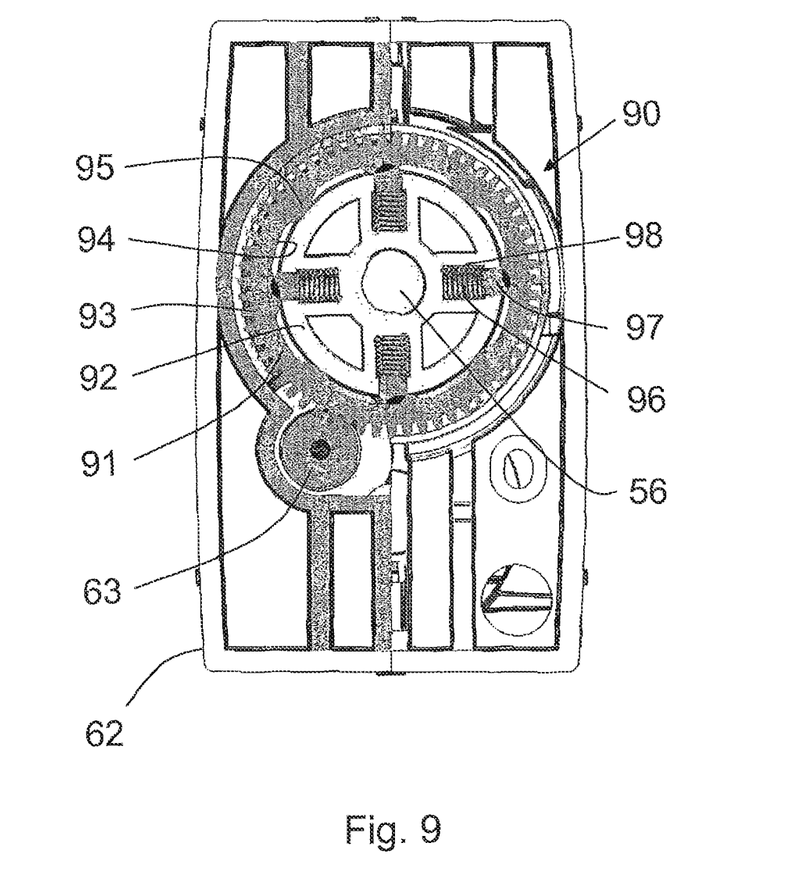
FIG. 9 shows a cross-sectional view of a clutch device of the exterior mirror arrangement according to the first embodiment, connected between an electric actuating unit and spindle.

FIG. 9 shows a cross-sectional view of a clutch 90 connected between the transmission 62 and the spindle 56. The clutch 90 transmits a torque from a transmission stage 63 of the transmission 62 via a clutch bell 91 to a carrier 92 and finally to the spindle 56 which is rotationally fixed to the carrier 92. The transmission stage 63 meshes with outer teeth 93 of the clutch bell 91. At the inner periphery 94 of the cylindrical or ring-like clutch bell 91 are protrusions or cams 95 evenly distributed over the periphery, which protrusions or cams 95 interact via compression springs 96 with radial outwardly biased rollers 97 of the carrier 92. This interaction and the function of the clutch 90 are described in detail below.

The carrier 92 comprises radially running, outwardly opening recesses 98 (in FIG. 9: four recesses) which are evenly distributed over the periphery, in which recesses the compression springs 96 are accommodated. These compression springs 96 load the rollers 97 which are arranged at their ends, radial outwardly against the inner periphery 94 of the clutch bell 91. Here the rollers 97 are located, for the most part, in the recesses 98. When the clutch bell 91 is driven via the transmission stage 63, the rollers 97 roll in the circumferential direction at the inner periphery 94 between the protrusions 95 of the clutch bell 91 until they run against one of the protrusions 95. The protrusions 95 attempt to inwardly push the rollers 97 against the spring force of the compression springs. The spring forces are chosen so that they do not inwardly deflect under a normal driving of the spindle 56 and by operation of the holding member such that the rollers of the carrier 92 and the protrusions 95 of the clutch bell 91 form a type of form-locking fit and therefore transmit torques from the clutch bell 91 to the carrier 92 and thus to the spindle 56.

In the case of a change in direction of the clutch bell 91, the carrier 92 stops until the rollers 97 run against the next protrusion 95 in the rotational direction and enter into the above mentioned form-locking fit with these.

In order to ensure an overload protection, the rollers 97 may be pushed so far radial inwardly under a predetermined threshold torque $M_K$ by the protrusions 95 against the compression springs 96 that they overcome the protrusions 95 according to the principle of a ratchetting clutch and permit a larger relative rotation between clutch bell 91 and carrier 92. Thus damage to the electric actuating unit 38 is prevented.

Figure 10:
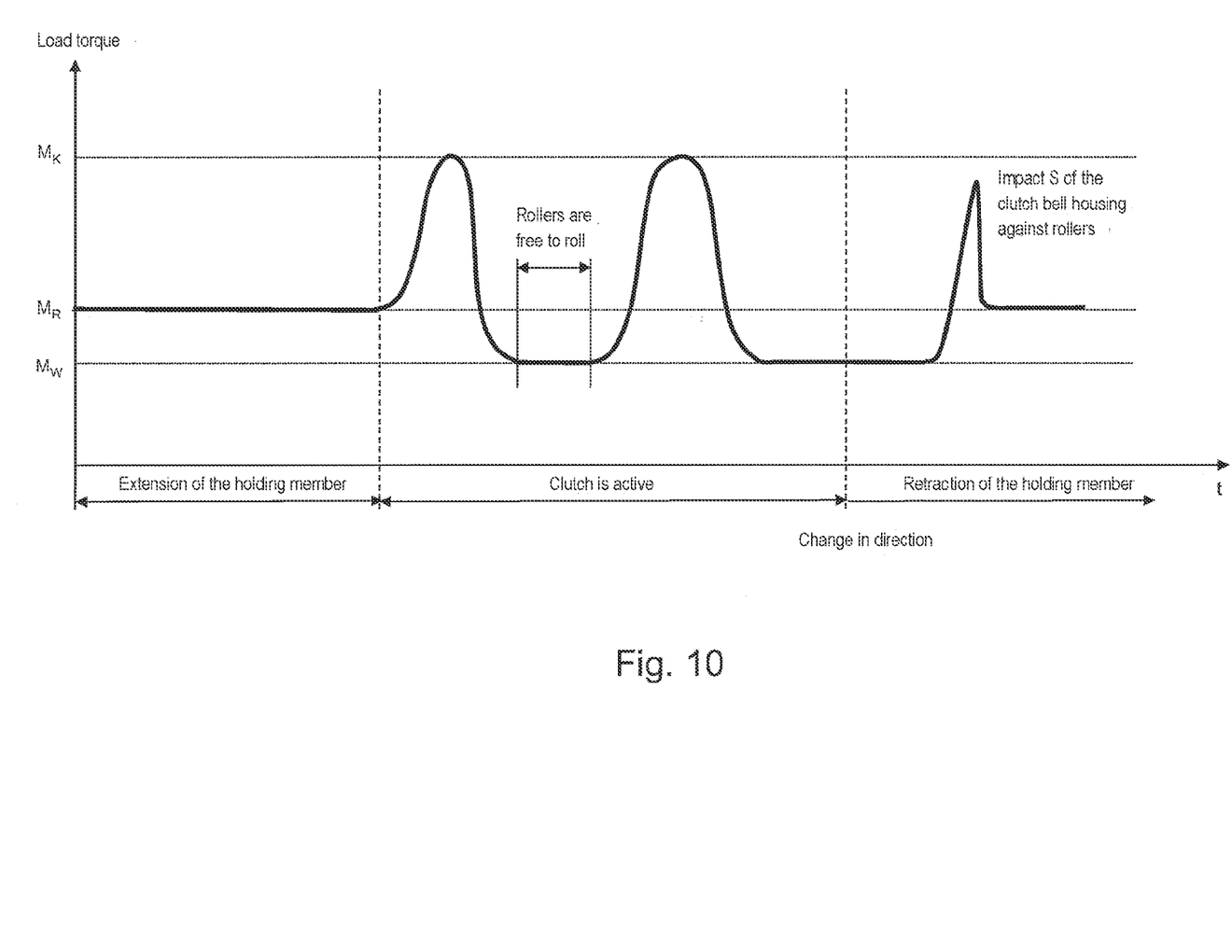
FIG. 10 shows a torque-time diagram during the adjustment of the holding member of the exterior mirror arrangement according to the first embodiment of the invention.

FIG. 10 shows a time-torque diagram. By excursion of the holding member 8, the rollers 97 lie at the protrusions 95 of the clutch bell 91 and thus transmit a determined torque which should reach at least the frictional torque $M_R$ between the holding member 8 and the clamping piece 20 in the sliding portion 14.

When the holding member 8 has reached its maximum extended position, for example because of a stop, the holding member 8, and with it the spindle 56 and/or the carrier 92 does not permit itself to rotate further. When the clutch bell 91 is further driven, the clutch bell 91 reaches relatively quickly the clutch torque $M_K$, i.e. the maximum torque $M_K$ transmittable via the clutch 90, which torque is determined by the interaction of the protrusions 95 and the compression springs 96. If the clutch torque $M_K$ is reached, the rollers 97 deflect radial inwardly such that the protrusions 95 can pass. As a result, the rollers 97 roll on the inner peripheral portion 94 between the protrusions 95, i.e. the rollers 97 roll freely. The rolling frictional torque $M_W$ between rollers 97 and clutch bell 91 lies below the frictional torque $M_R$, i.e. below the torque to be transmitted normally. After a predetermined rotational angle $\phi$, the rollers 97 again run against the corresponding protrusions 95 and pass these when the clutch torque $M_K$ is exceeded.

When the rotational direction of the clutch bell 91 changes, the rollers 97 roll in the opposite direction until the next protrusion. That means it is therefore possible, with a change in direction, to run though the free-travel arc length $\phi$ without load until the opposite flanks of the protrusions 95 make contact with the rollers 97. Here a part of the kinetic energy of the clutch bell 91 and of the inertial mass of the motor is imparted in the form of an impact S to the rollers 97 and with it to the carrier 92, before the form-locking fit between the rollers 97 and the protrusions 95, i.e. between the clutch bell 91 and the carrier 92 is set up and the torque $M_R$ to be transmitted has been transmitted.

This effect which is undesired in normal transmission technology, is intentional in the exterior mirror arrangement according to the invention. Namely, if the extension movement of the holding member (Phase I in FIG. 10) is continued until the clutch operation initiates (Phase II in FIG. 10), a light loading of the slider 40 with the spindle 56 is not to be excluded. This loading or jamming may be released by the impact or impulse input, upon the change in direction. In addition, the holding member 8 can jam due to dirt contamination inside the housing 6. When this jamming is not released with the first impact and the clutch torque MK is exceeded, the clutch 90 latches over. The periodical impulse input, created in this way, on the carrier 92 and thereby on the spindle 56 leads to gradual loosening of the dirt particles. Thus the dirt particles, which give rise to a jamming between holding member 8 and housing 6, can be loosened effectively.

The free travel also has the further advantage, that the electric motor 60 can start up almost load-free up to a speed less than the rated speed. With a switching off of the feed rate, the rest position of the spindle 56 and with it that of the carrier 92 is initiated, such that the rollers 97 come to rest, relative to the rotational direction present in feeding, directly before the flanks of the wave-like raised portions in the clutch bell 91. It is therefore possible, with a change in direction, to run though the free-travel arc length $\phi$ without load until the flanks lying opposite the flanks make contact with the rollers 97.

Thus the clutch 90 comprises a large play $\phi$ between carrier 92 and clutch bell 91. However, this is unproblematic within the context of the exterior mirror arrangement 2 according to the invention since the kinematic chain between motor 60 and holding member 8 is disconnected by the clamping. Therefore the play in the clutch 90 does not act as play between holding member 8 and housing 6.

Figure 11:
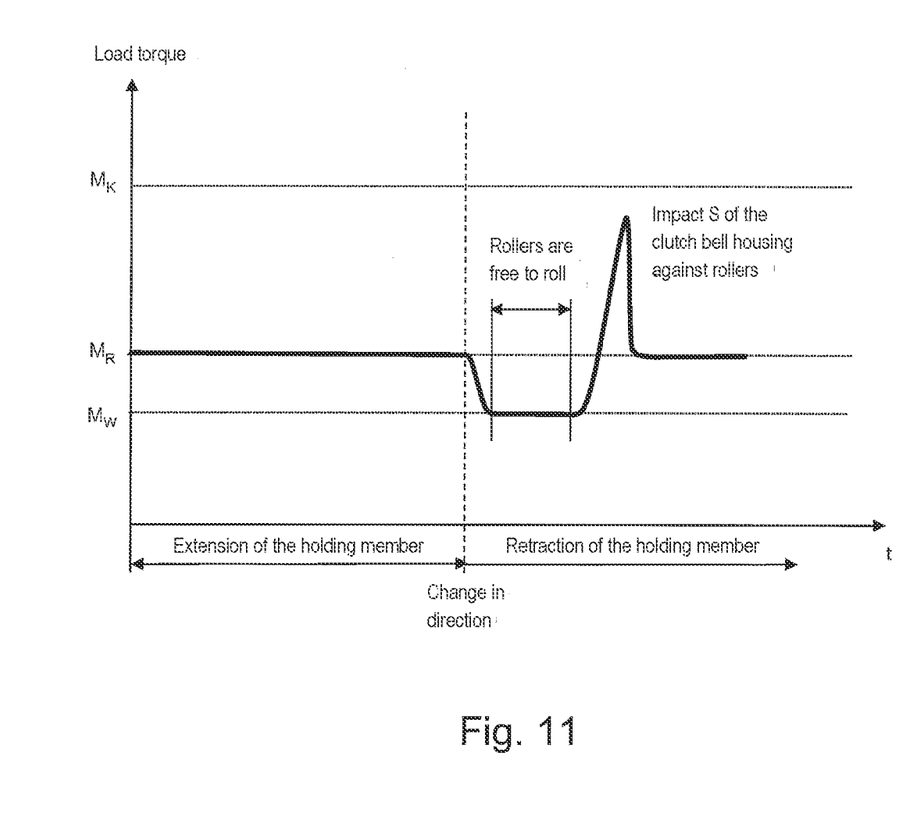
FIG. 11 shows a further torque-time diagram during the adjustment of the holding member of the exterior mirror arrangement according to the first embodiment of the invention.

FIG. 11 shows a further torque-time diagram in the case of the adjustment of the holding member 8. It shows the load torque in the case of an ordinary change in rotational direction without showing the load torque in the case of overload. Because the protrusions 95 at the inner periphery 94 of the clutch bell 91 are spaced apart from each other, a known time elapses until the rollers 97 meet the protrusions 95 in the opposite direction at the inner periphery 94 of the clutch bell 91. The transmittable torque reduces to the frictional torque $M_W$ that exists when the rollers 97 roll on the inner peripheral surface 94 of the clutch bell 91. When the rollers 97—until then load-free—meet the flanks of the next protrusions 95, an impact torque conditional on inertia acts on the rollers 95 that however decays rapidly to the normal operating torque.

Figure 12:
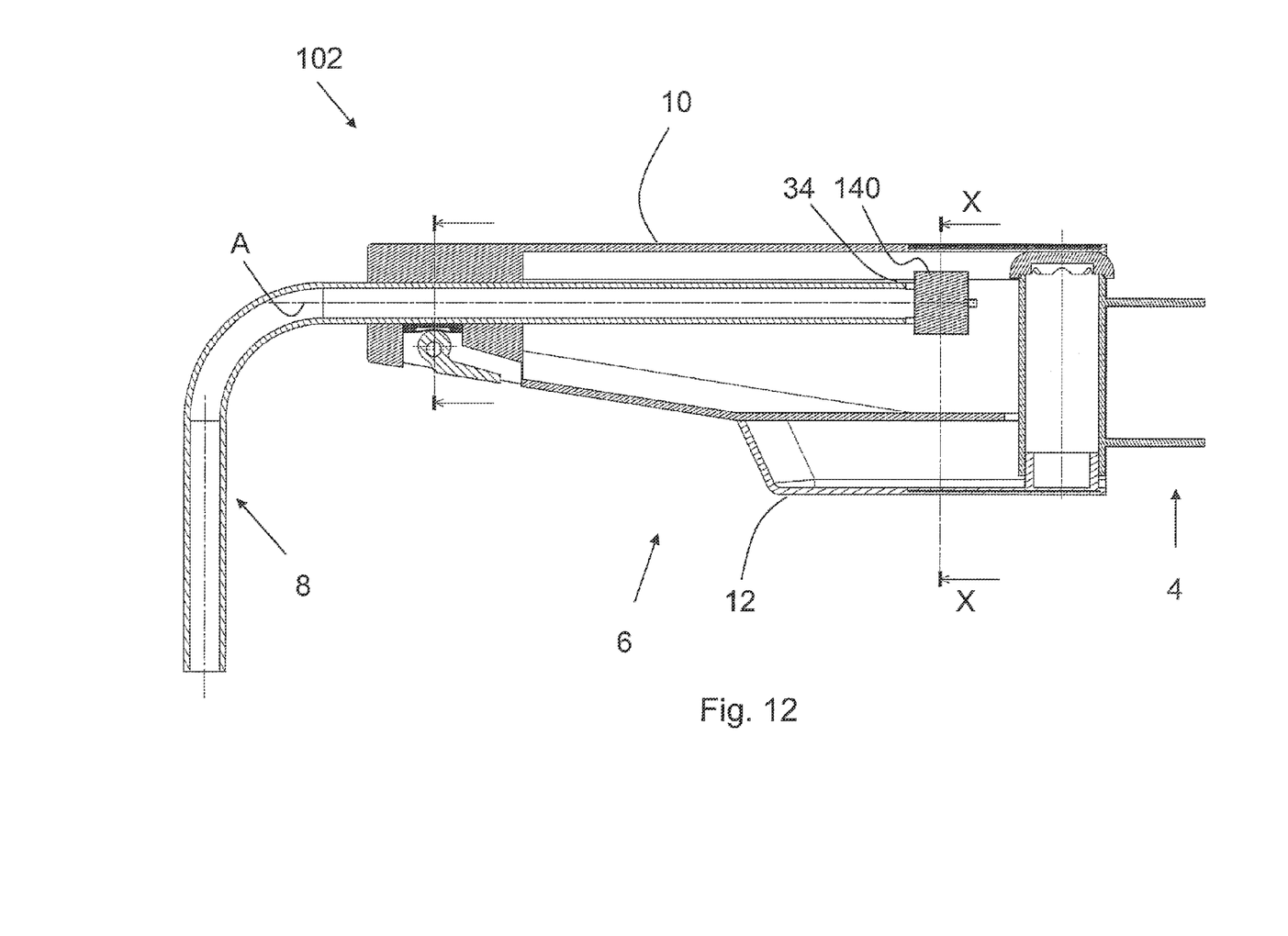
FIG. 12 shows a cross-sectional view of an exterior mirror arrangement according to a second embodiment of the invention.

FIG. 12 shows an exterior mirror arrangement 102 according to a second embodiment of the invention. This differs from the exterior mirror arrangement of the first embodiment essentially in that the adjustment of the holding member 8 is not made via an electric actuating unit, rather takes place manually, which is why in the following only the differences to the first embodiment are covered.

In addition to the electric actuating unit 58, the spindle 56 can also be omitted. Therefore the slider can be designed differently, as can be seen from FIG. 13.

Figure 13:
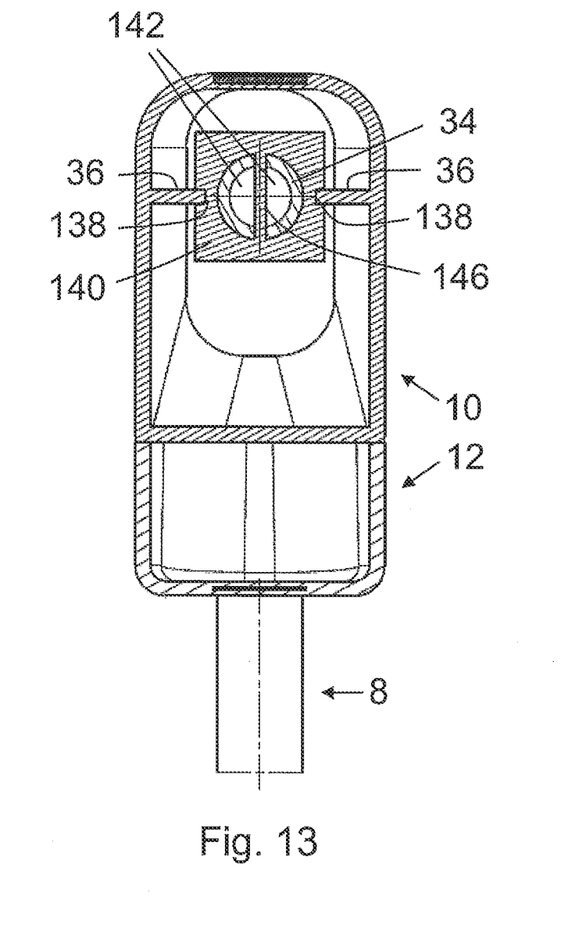
FIG. 13 shows a cross-sectional view along the line XIII-XIII of FIG. 12.

The slider 140 has essentially a cube-shaped body as in the first embodiment, wherein said body comprises longitudinal grooves 138 on two opposite sides, which longitudinal grooves 138 can receive the guide ribs 36. In the place of the cylindrical recess 42 and both of the inwardly protruding protrusions 46, the slider 140 comprises two semi-cylindrical recesses 142 which are separated by a material bridge 146 In this way the slider 140 can, as with the first embodiment, be slid to a longitudinally split end section 34 of the holding member 8. In this way the slider 140 is fixed by a positive (form-locking) fit and rotationally fixed to the holding member 8. The axial fixing to the end section 34 of the holding member 8 can take place as in the first embodiment.

In the case of the manual variant, the clamping lever 26 is released before the adjusting of the holding member 8 and the position is fixed after the adjusting by closing the clamping lever 26.

Although in FIG. 12 the fastening to the holder 4 is shown differently, this may be designed as above in the first embodiment (see FIG. 1). The same applies to the sliding portion.

In the above, an exterior mirror arrangement for motor vehicles according to two embodiments has been described, by which a housing portion, formed as one piece from plastic, alone carries and guides the holding member for a vehicle exterior mirror. In this way a light, economical exterior mirror arrangement which satisfies the strength requirements is achieved.

Of course the exterior mirror arrangement described above can be modified within the scope of the claims.

For example, the adjustment of the holding member can take place via cables or a rack drive.

Furthermore the elements which are complementary to each other, for example the connection between the slider and the end section of the holding member or the guide ribs, can be inversely designed. For example the slider can comprise longitudinally running protrusions which slide in corresponding grooves in the first housing portion.

The axial lengths of the housing can be shortened or lengthened according to the necessary displacement of the holding member.

Furthermore the guide ribs can also be strengthened with metal inserts. Alternatively the slider can be guided from all sides, i.e. by four guide ribs.

Stops can be provided at the guide ribs and/or the first housing portion for limiting the maximum displacement.

In addition the metal inserts at the fixing portion of each housing portion may be designed longer thicker according to expected torsion and bending moments.

Furthermore, in some circumstances, the glide strips in the sliding portion may be omitted or other materials may be used for the glide strips.

Moreover, the clutch device according to the invention is considered as an independent invention whose application is not necessarily limited to the described exterior mirror arrangement, rather it can be transferred to other exterior mirror arrangements and systems outside this technical field. Therefore, the Applicant reserves the right to submit an independent protection of the clutch device alone.

The invention claimed is:

1. An exterior mirror arrangement for motor vehicles, the exterior mirror arrangement comprising:
   a holder mounted on the vehicle;
   a housing fixed to the holder; and
   a holding member for a vehicle exterior mirror, the holding member axially displaceably accommodated in the housing, wherein
   the housing has a first housing portion which is formed as one piece from plastic and alone guides the holding member;
   the first housing portion comprises a plain bearing portion in which the holding member is linearly guided directly at the housing portion or on glide stripes incorporated in the housing portion; and
   for the purpose of fixedly clamping the holding member to the plain bearing portion, a clamping device is provided.

2. The exterior mirror arrangement according to claim 1, wherein
   the holding member is tubularly formed.

3. The exterior mirror arrangement according to claim 1, wherein
   a clamping piece is loadable via a cam of a clamping lever pivotably arranged at the first housing portion against the external wall of the holding member, under interposing of a leaf spring arrangement.

4. The exterior mirror arrangement according to claim 3, wherein
   the clamping lever is completely accommodated in a recess of the first housing portion when in the clamped state.

5. The exterior mirror arrangement according to claim 1, wherein
   the first housing portion furthermore comprises a guide section having one or a plurality of guide ribs which engage in corresponding grooves of a slider arranged at the holding member and fixedly connected to it, wherein the grooves and the guide ribs extend in the adjustment direction of the holding member.

6. The exterior mirror arrangement according to claim 1, wherein
   the housing comprises a second housing portion, which is integrally formed from plastic, via which the first housing portion can be connected to the holder mounted to the vehicle.

7. The exterior mirror arrangement according to claim 6, wherein
   a fixing portion of the first and/or second housing portion, mounted on the vehicle, for fastening to the holder, comprises a metal plate or a metal insert molded into the housing portion.

8. The exterior mirror arrangement according to claim 6, wherein
   the holder comprises a integrally formed latching tooth geometry which stays in operative connection with a latching element arranged between the fixing portion of the first or second housing portion and the holder.

9. The exterior mirror arrangement according to claim 6, wherein
   the holder comprises a receiving portion for a plain bearing bush configured at the fixing portion of the first or second housing portion.

10. The exterior mirror arrangement according to claim 1, wherein
    the holding member is adjustable via a spindle driven by an electric actuating unit, which spindle engages with a trapezoidal thread formed in the slider, or via cables coupled with the slider or via a rack drive.

11. The exterior mirror arrangement according to claim 10, wherein
    the electric actuating unit is arranged in the first housing portion and a vehicle-side external periphery section of the electric actuating unit is complementarily configured to a circumferential inner wall of the first housing portion.

12. The exterior mirror arrangement according to claim 10, wherein
    the electric actuating unit can adjust the holding member even when the holding member is firmly pressed to the plain bearing portion via the clamping device.

13. The exterior mirror arrangement according to claim 10, wherein a clutch device is connected between the electric actuating unit and the spindle, which electric actuating unit permits a transmission of a torque ($M_R$) necessary for the adjustment of the holding member from the electric actuating unit to the spindle in both directions and, in the event of an overload torque greater than a predetermined threshold torque ($M_K$), automatically permits a relative rotation between the electric actuating unit and the spindle, wherein the clutch device, in the event of a torque direction reversal, does not transmit a load torque (MR) necessary for the adjustment of the holding member over a predetermined free-travel angle ($\phi$).

14. The exterior mirror arrangement according to claim 13, wherein the clutch device comprises a clutch bell driven by the electric actuating unit and a carrier rotationally fixedly connected to the spindle, wherein the carrier comprises rolling elements or sliding elements distributed evenly over the periphery and radial outwardly spring-loaded and pressed against an inner wall of the clutch bell; and the inner wall of the clutch bell comprises evenly distributed raised portions over its periphery, which raised portions push the rolling elements or sliding elements in the event of an overload torque greater than the predetermined threshold torque ($M_K$).

15. The exterior mirror arrangement according to claim 14, wherein the number of the raised portions is higher than the number of rolling elements or sliding elements.

* * * * *